United States Patent
Arcouette

(10) Patent No.: US 10,406,425 B2
(45) Date of Patent: Sep. 10, 2019

(54) SNOW BIKE

(71) Applicant: Gautier Arcouette, Mansonville (CA)

(72) Inventor: Gautier Arcouette, Mansonville (CA)

(73) Assignee: SIQ MOUNTAIN INDUSTRIES INC., Kelowna (CA)

( * ) Notice: Subject to any disclaimer, the term of this patent is extended or adjusted under 35 U.S.C. 154(b) by 0 days.

(21) Appl. No.: 16/074,512

(22) PCT Filed: Feb. 1, 2017

(86) PCT No.: PCT/CA2017/050110
§ 371 (c)(1),
(2) Date: Aug. 1, 2018

(87) PCT Pub. No.: WO2017/132759
PCT Pub. Date: Aug. 10, 2017

(65) Prior Publication Data
US 2019/0046861 A1   Feb. 14, 2019

(30) Foreign Application Priority Data
Feb. 1, 2016   (CA) ...................................... 2919402

(51) Int. Cl.
*B62B 13/04* (2006.01)
*A63C 5/03* (2006.01)
*A63C 5/02* (2006.01)
*B62B 17/06* (2006.01)

(52) U.S. Cl.
CPC ................ *A63C 5/031* (2013.01); *A63C 5/02* (2013.01); *B62B 13/043* (2013.01); *B62B 17/062* (2013.01); *B62B 17/065* (2013.01); *A63C 5/03* (2013.01); *A63C 2203/06* (2013.01)

(58) Field of Classification Search
CPC .. A63C 5/031; A63C 5/02; A63C 5/03; A63C 2203/06; B62B 17/065; B62B 17/062; B62B 13/043
See application file for complete search history.

(56) References Cited

U.S. PATENT DOCUMENTS 1,672,782 A * 6/1928 King ..................... B62B 13/04
                                                            280/22
2,062,953 A * 12/1936 Wargo ................... B62B 13/04
                                                            280/20

(Continued)

FOREIGN PATENT DOCUMENTS

| CA | 2656960 A1 | 1/2008 | |
| WO | 99/29377 A1 | 6/1999 | |
| WO | WO-9929377 A1 * | 6/1999 | ............... A63C 5/00 |

OTHER PUBLICATIONS

Canadian Intellectual Property Office, International Search Report and Written Opinion of the International Searching Authority in PCT/CA2017/050110, dated Apr. 26, 2017, which is the international application to this U.S. application.

*Primary Examiner* — Jacob B Meyer
(74) *Attorney, Agent, or Firm* — Kolitch Romano LLP

(57) ABSTRACT

The present invention relates to an apparatus for attachment to a slidable runner, adjustable between a folded configuration for transport or storage and an unfolded configuration for use, and tunable to match various terrain characteristics and user characteristics and preferences.

11 Claims, 13 Drawing Sheets

(56) References Cited

U.S. PATENT DOCUMENTS

| | | | | |
|---|---|---|---|---|
| 2,442,404 A * | 6/1948 | Foner | B62B 13/10 | 280/16 |
| 2,479,674 A * | 8/1949 | Elliott | B29D 30/66 | 280/16 |
| 2,528,397 A * | 10/1950 | Stof | B62B 13/04 | 280/16 |
| 2,637,565 A * | 5/1953 | Lantry | B62B 13/10 | 280/14.28 |
| 3,014,731 A * | 12/1961 | Dworak | B62B 13/02 | 280/16 |
| 3,178,196 A * | 4/1965 | Colace | B62B 13/04 | 280/16 |
| 3,336,037 A * | 8/1967 | Brozovich | B62M 27/00 | 180/183 |
| 3,560,012 A * | 2/1971 | Auer | B62B 13/16 | 280/16 |
| 3,561,783 A * | 2/1971 | Ellett | B62B 13/04 | 280/16 |
| 3,588,138 A * | 6/1971 | Cerny, Jr. | B62B 13/12 | 280/16 |
| 3,638,960 A * | 2/1972 | Eaton | B62B 13/16 | 280/16 |
| 3,682,495 A * | 8/1972 | Zaimi | B62B 13/08 | 180/182 |
| 3,870,329 A * | 3/1975 | Evequoz | B62B 13/04 | 280/16 |
| 3,870,330 A * | 3/1975 | Hatano | B62B 13/04 | 280/16 |
| 3,894,746 A * | 7/1975 | Evequoz | B62B 17/04 | 280/16 |
| 3,917,301 A * | 11/1975 | Fabris | B62B 13/04 | 280/25 |
| 4,097,055 A * | 6/1978 | Laycraft | B62B 13/04 | 280/16 |
| 4,632,408 A * | 12/1986 | Olpp | A63C 5/031 | 280/16 |
| 4,725,069 A * | 2/1988 | Stampacchia | A63C 5/031 | 280/11.28 |
| 5,064,208 A * | 11/1991 | Bibollet | A63C 5/00 | 180/190 |
| 5,863,051 A * | 1/1999 | Brenter | B62B 13/04 | 280/16 |
| 6,019,380 A * | 2/2000 | Goodman | A63C 5/00 | 280/14.1 |
| 6,036,202 A * | 3/2000 | LaCome | A63C 5/00 | 280/25 |
| 6,179,305 B1 * | 1/2001 | Capozzi | A63C 5/00 | 280/14.1 |
| D446,474 S * | 8/2001 | Monike | D12/9 | |
| 6,431,562 B1 * | 8/2002 | Vontobel | B62B 13/043 | 280/20 |
| 6,736,414 B2 * | 5/2004 | Farrally-Plourde | B62B 13/04 | 280/14.25 |
| 6,783,134 B2 * | 8/2004 | Geary | A63C 5/031 | 280/16 |
| 6,929,267 B2 * | 8/2005 | Sullivan | A63C 5/02 | 280/14.21 |
| 6,997,465 B2 * | 2/2006 | Jungnickel | B62B 13/043 | 280/14.27 |
| 7,232,133 B2 * | 6/2007 | Stevens | B62B 17/08 | 280/16 |
| 7,240,908 B2 * | 7/2007 | Sankrithi | A63C 5/033 | 280/14.21 |
| 7,537,221 B2 * | 5/2009 | Lasala | B62B 13/04 | 280/11.12 |
| 7,547,023 B2 * | 6/2009 | Yau | B62B 13/043 | 280/16 |
| 7,896,362 B1 * | 3/2011 | Scatchard | B62K 13/00 | 280/7.1 |
| 8,109,523 B2 * | 2/2012 | Kolesar | B61B 11/008 | 280/14.25 |
| 8,177,241 B1 * | 5/2012 | Marks | B62B 13/046 | 280/14.28 |
| 8,308,172 B2 * | 11/2012 | Gulbranson | B62B 13/043 | 280/14.1 |
| 8,398,095 B2 * | 3/2013 | Kolesar | B61B 11/008 | 280/14.25 |
| 8,403,342 B1 * | 3/2013 | McDaniel | B62K 13/00 | 280/21.1 |
| 9,333,982 B1 * | 5/2016 | Rapp | B62B 13/005 | |
| 9,452,342 B2 * | 9/2016 | Rapp | B62B 17/062 | |
| 9,637,156 B2 * | 5/2017 | Rapp | A63C 5/075 | |
| 9,828,015 B2 * | 11/2017 | Kasparian | B62B 17/08 | |
| 2001/0038184 A1 * | 11/2001 | Stafford | B62B 13/04 | 280/14.27 |
| 2003/0038434 A1 * | 2/2003 | Farrally-Plourde | B62B 13/04 | 280/16 |
| 2003/0222419 A1 * | 12/2003 | Geary | A63C 5/031 | 280/21.1 |
| 2004/0007838 A1 * | 1/2004 | Farmer | A63C 5/03 | 280/14.27 |
| 2005/0218610 A1 * | 10/2005 | Sankrithi | A63C 5/033 | 280/14.21 |
| 2006/0197294 A1 * | 9/2006 | Yau | B62B 13/043 | 280/16 |
| 2007/0267827 A1 * | 11/2007 | Lasala | B62B 13/04 | 280/14.28 |
| 2009/0033047 A1 * | 2/2009 | Paganoni | B62B 13/04 | 280/14.28 |
| 2009/0140503 A1 * | 6/2009 | Kolesar | B61B 11/008 | 280/16 |
| 2009/0230641 A1 * | 9/2009 | Eugenio | B62B 13/04 | 280/16 |
| 2010/0109267 A1 * | 5/2010 | Leycraft | B62B 13/04 | 280/21.1 |
| 2013/0075988 A1 * | 3/2013 | Kolesar | B61B 11/008 | 280/16 |
| 2015/0183452 A1 * | 7/2015 | Kasparian | B62B 17/08 | 280/16 |
| 2015/0353117 A1 * | 12/2015 | Peng | B62B 17/062 | 280/14.21 |
| 2016/0114825 A1 * | 4/2016 | Rapp | B62B 13/005 | 280/14.1 |
| 2016/0229442 A1 * | 8/2016 | Rapp | B62B 17/062 | |
| 2017/0015344 A1 * | 1/2017 | Rapp | A63C 5/075 | |
| 2019/0046861 A1 * | 2/2019 | Arcouette | A63C 5/02 | |

* cited by examiner

SNOW BIKE

CROSS REFERENCE TO RELATED APPLICATIONS

This application claims priority from Canadian Patent Application serial number CA2,919,402 filed on Feb. 1, 2016, entitled Foldable Snow Bike, which is expressly incorporated by reference herein to the fullest extent permitted by law.

FIELD

The present invention relates to an apparatus to slide a person over terrain, such as terrain covered by snow, ice or sand for example, including for athletic, recreational, or transportation uses, for example transiting down a mountain.

INTRODUCTION

Apparatus for sliding a person over terrain are known, for example:
athletic equipment such as skis and snowboards, and
vehicles such as sleds and sleighs.

Conventionally, such vehicles tend to convey a person as a passenger, more passively than the athletic equipment, but might offer instead greater protection and adaptability to a wider variety of terrains and conditions. Conventionally, the athletic equipment tends to support its user's own movement, enhancing his abilities, but generally leaving him less protected and therefore perhaps inclined to challenge only safer or more groomed terrains.

Accordingly, what is needed is an intermediate apparatus that offers some of the benefits of both athletic equipment and vehicles—a snow bike—that can be portable and thrilling like athletic equipment, can be adapted for, and offer some degree of protection against, a variety of terrains, and can be tuned for a variety of user characteristics and preferences.

SUMMARY

The present invention is directed to this need.

According to one aspect of the present invention, there is provided an apparatus for attachment to a slidable runner at forward and aft attachment points, the apparatus having: an elongated support with a handlebar end and an opposite footrest end; a handlebar assembly connected to the handlebar end of the support; a footrest assembly proximate to the footrest end of the support; a forward bar, pivotally connected to the footrest end of the support and pivotally attachable to the forward attachment point of the runner; an aft bar, pivotally connected to the forward bar and pivotally attachable to the aft attachment point of the runner; and a suspension assembly coupling at least one of the forward bar and aft bar to the support. The handlebar assembly may be pivotally connected to the handlebar end of the support.

The location at which the aft bar is pivotally connected to the forward bar may be user-selectable and may include a limiting subassembly adapted to limit pivoting at the connection between the aft bar and the forward bar. In this regard, the limiting subassembly may include a locking pin.

The suspension assembly may include a first strut assembly connected between the aft bar and the support and a second strut assembly connected between the aft bar and the forward bar. At least one of: the location at which the first strut assembly is connected to at least one of: the aft bar, and the support, and the location at which the second strut assembly is connected to at least one of the aft bar, and the forward bar may be user-selectable.

To provide for transforming the apparatus between a folded configuration, for storage or transport, and an unfolded configuration for use, at least one of the connection between the handlebar assembly and the support, the connection between the forward bar and the support, the connection between the aft bar and the forward bar, the connection between the first strut assembly and the aft bar, the connection between the first strut assembly and the support, the connection between the second strut assembly and the aft bar, and the connection between the second strut assembly and the forward bar may be adapted to be at least one of connected, disconnected and pivoted by a user.

The apparatus may include the runner.

Further aspects and advantages of the present invention will become apparent upon considering the following drawings, description, and claims.

BRIEF DESCRIPTION OF THE DRAWINGS

The invention will be more fully illustrated by the following detailed description of non-limiting specific embodiments in conjunction with the accompanying drawing figures. In the figures, similar elements and/or features may have the same reference label. Further, various elements of the same type but in different embodiments may be distinguished by different most-significant digits.

Figure 1:
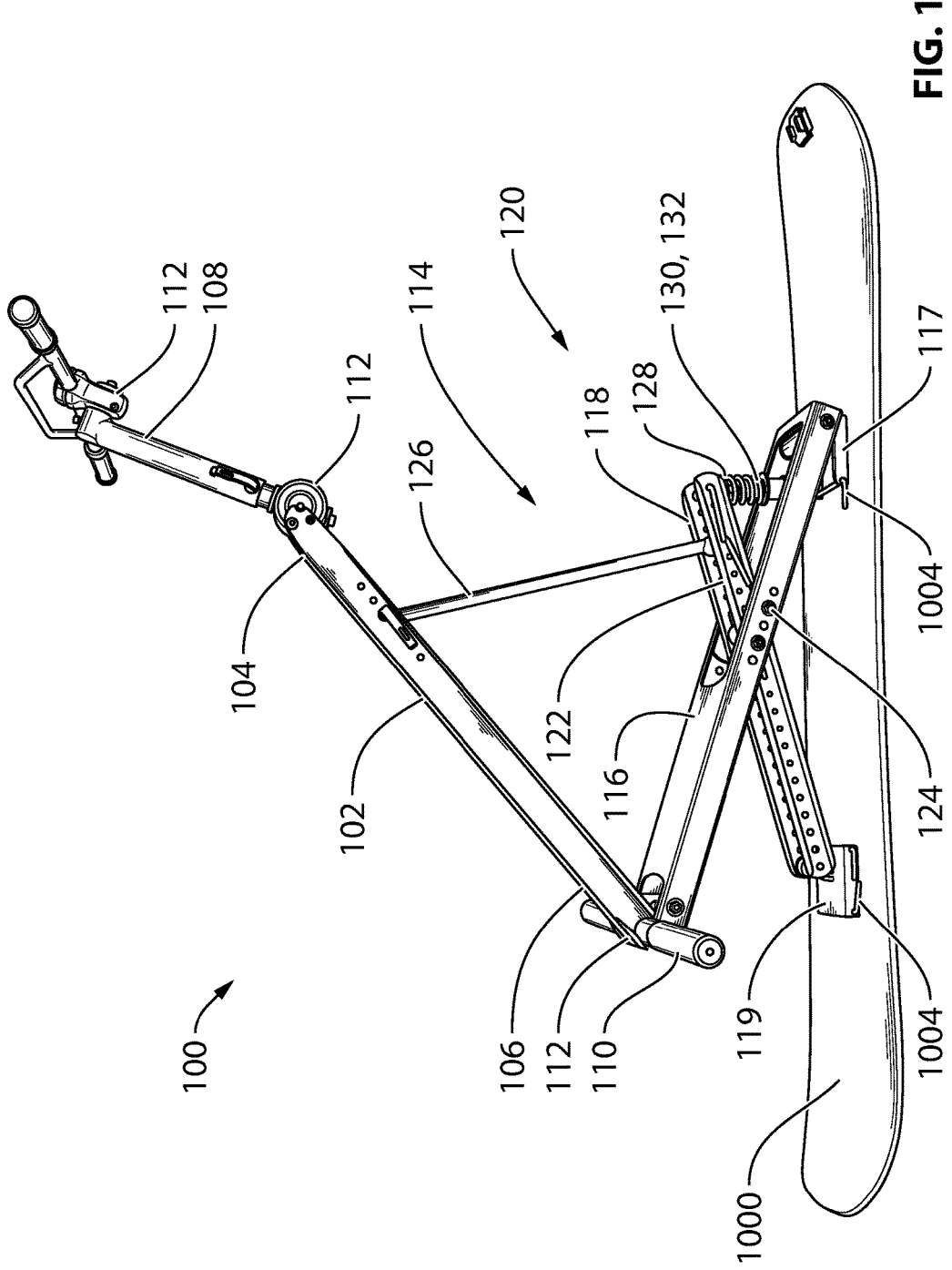
FIG. 1 is a left oblique view of a first embodiment of a snow bike apparatus according to aspects of the present invention, the snow bike apparatus shown in an unfolded configuration for operation.

DETAILED DESCRIPTION (a) Structure of Specific Embodiments

The structure of the invention will now be illustrated by explanation of specific, non-limiting, exemplary embodiments shown in the drawing figures and described in greater detail herein.

i. First Embodiment

FIGS. 1-6 show a snow bike apparatus according to a first embodiment of the present invention, generally illustrated at 100.

The apparatus 100 is attachable to a runner 1000 that is slidable over terrain (not shown), for example snow, ice or sand. In one embodiment, the runner 1000 is a conventional snowboard with conventional bindings, which provide a forward attachment point 1002 and an aft attachment point 1004 at which to attach the apparatus 100.

The foundation of the apparatus 100 is an elongated support 102 having a handlebar end 104 and an opposite footrest end 106. The apparatus 100 further includes a handlebar assembly 108 connected to the handlebar end 104 of the support 102 and a footrest assembly 110 proximate to, as illustrated connected to, the footrest end 106 of the support 102. As illustrated, the handlebar assembly 108 may be pivotally connected to the handlebar end 104 of the support 102. The handlebar assembly 108 and the footrest assembly 110 may include lockable pivots 112 to provide further folding.

The apparatus 100 also includes a user-adjustable mounting linkage 114 that connects the support 102 to the runner 1000, the user-adjustable mounting linkage 114 including:
- a forward bar 116, pivotally connected to the footrest end 106 of the support 102 and pivotally attachable via a forward footing 117 to the forward attachment point 1002 of the runner 1000, and
- an aft bar 118, pivotally connected to the forward bar 116 and pivotally attachable via an aft footing 119 to the aft attachment point 1004 of the runner 1000.

The user-adjustable mounting linkage 114 further includes a suspension assembly 120 coupling the forward bar 116 and aft bar 118 to the support 102.

As illustrated, the location at which the aft bar 118 is pivotally connected to the forward bar 116 may be user-selectable. The apparatus 100 may further include a limiting subassembly 122 to limit pivoting at the connection between the aft bar 118 and the forward bar 116. In this regard, the limiting subassembly 122 may include a locking pin 124.

As illustrated, the suspension assembly 120 may include a first strut assembly 126 connected between the aft bar 118 and the support 102 and a second strut assembly 128 connected between the aft bar 118 and the forward bar 116. The first strut assembly 126 or, as illustrated, the second strut assembly 128, may include a spring 130 or more generally a shock absorber 132.

To provide for tuning the apparatus 100 for particular user's characteristics, for example size, weight and desired riding style, and for particular terrain, it may be desirable to be able to adjust the apparatus 100. In this regard, as illustrated, at least one of the location at which the first strut assembly 126 is connected to at least one of the aft bar 118 and the support 102, and the location at which the second strut assembly 128 is connected to at least one of the aft bar 118 and the forward bar 116 may be adjustable, for example user-selectable.

To provide for transforming the apparatus 100 between a folded configuration, for storage or transport, and an unfolded configuration for use, at least one of:
- the connection between the handlebar assembly 108 and the support 102,
- the connection between the footrest assembly 110 and the support 102,
- the connection between the forward bar 116 and the support 102,
- the connection between the aft bar 118 and the forward bar 116,
- the connection between the first strut assembly 126 and the aft bar 118,
- the connection between the first strut assembly 126 and the support 102,
- the connection between the second strut assembly 128 and the aft bar 118, and
- the connection between the second strut assembly 128 and the forward bar 116, may be adapted to be connected, disconnected, and/or pivoted by a user.

Those skilled in the art will recognize that all pivots may be user-lockable or tightenable, for example in conventional ways.

ii. Second Embodiment

FIGS. 7-11 show a snow bike apparatus according to a second embodiment of the present invention, generally illustrated at 200.

The apparatus 200 is attachable to a dual runner 2000 that is slidable over terrain (not shown), for example snow, ice or sand. In one embodiment, the dual runner 2000 is a conventional split snowboard or pair of skis, with conventional bindings, which provide a forward attachment point 2002 and an aft attachment point 2004 at which to attach the apparatus 200.

The foundation of the apparatus 200 is an elongated support 202 having a handlebar end 204 and an opposite footrest end 206. The apparatus 200 further includes a handlebar assembly 208 connected to the handlebar end 204 of the support 202 and a footrest assembly 210 proximate to the footrest end 206 of the support 202. As illustrated, the handlebar assembly 208 may be pivotally connected to the handlebar end 204 of the support 202. The handlebar assembly 208 and the footrest assembly 210 may include lockable pivots 212 to provide further folding.

The apparatus 200 also includes a user-adjustable mounting linkage 214 that connects the support 202 to the dual runner 2000, the user-adjustable mounting linkage 214 including:
- a forward bar 216, pivotally connected to the footrest end 206 of the support 202 and pivotally attachable via a forward footing 217 to the forward attachment point 2002 of the dual runner 2000, and
- an aft bar 218, pivotally connected to the forward bar 216 and pivotally attachable via an aft footing 219 to the aft attachment point 2004 of the dual runner 2000.

In this embodiment, the footrest assembly 210 is connected to the forward bar 216, proximate to the footrest end 206 of the support 202.

The user-adjustable mounting linkage 214 further includes a suspension assembly 220 coupling the aft bar 218 to the support 202.

As illustrated, the location at which the aft bar 218 is pivotally connected to the forward bar 216 may be user-selectable. The apparatus 200 may further include a limiting subassembly 222 to limit pivoting at the connection between the aft bar 218 and the forward bar 216. In this regard, the limiting subassembly 222 may include a locking pin 224.

As illustrated, the suspension assembly 220 may include a first strut assembly 226 connected between the aft bar 218 and the support 202. The first strut assembly 226 may include a spring 230 or more generally a shock absorber 232.

As illustrated, the apparatus 200 may further include a fin 234, for example deployable by rotation from the aft footing 219 between the dual runners 2000, to alter the stability or steering characteristics of the apparatus 200.

To provide for tuning the apparatus 200 for particular user's characteristics, for example size, weight and desired riding style, and for particular terrain, it may be desirable to be able to adjust the apparatus 200. In this regard, as illustrated, the location at which the first strut assembly 226 is connected to at least one of the aft bar 218 and the support 202 may be adjustable, for example user-selectable.

To provide for transforming the apparatus 200 between a folded configuration, for storage or transport, and an unfolded configuration for use, at least one of:

the connection between the handlebar assembly 108 and the support 102, the connection between the forward bar 116 and the support 102, the connection between the aft bar 118 and the forward bar 116, and the connection between the first strut assembly 126 and the aft bar 118, may be adapted to be connected, disconnected, and/or pivoted by a user.

Those skilled in the art will recognize that all pivots may be user-lockable or tightenable, for example in conventional ways.

iii. Third Embodiment

Figure 12:
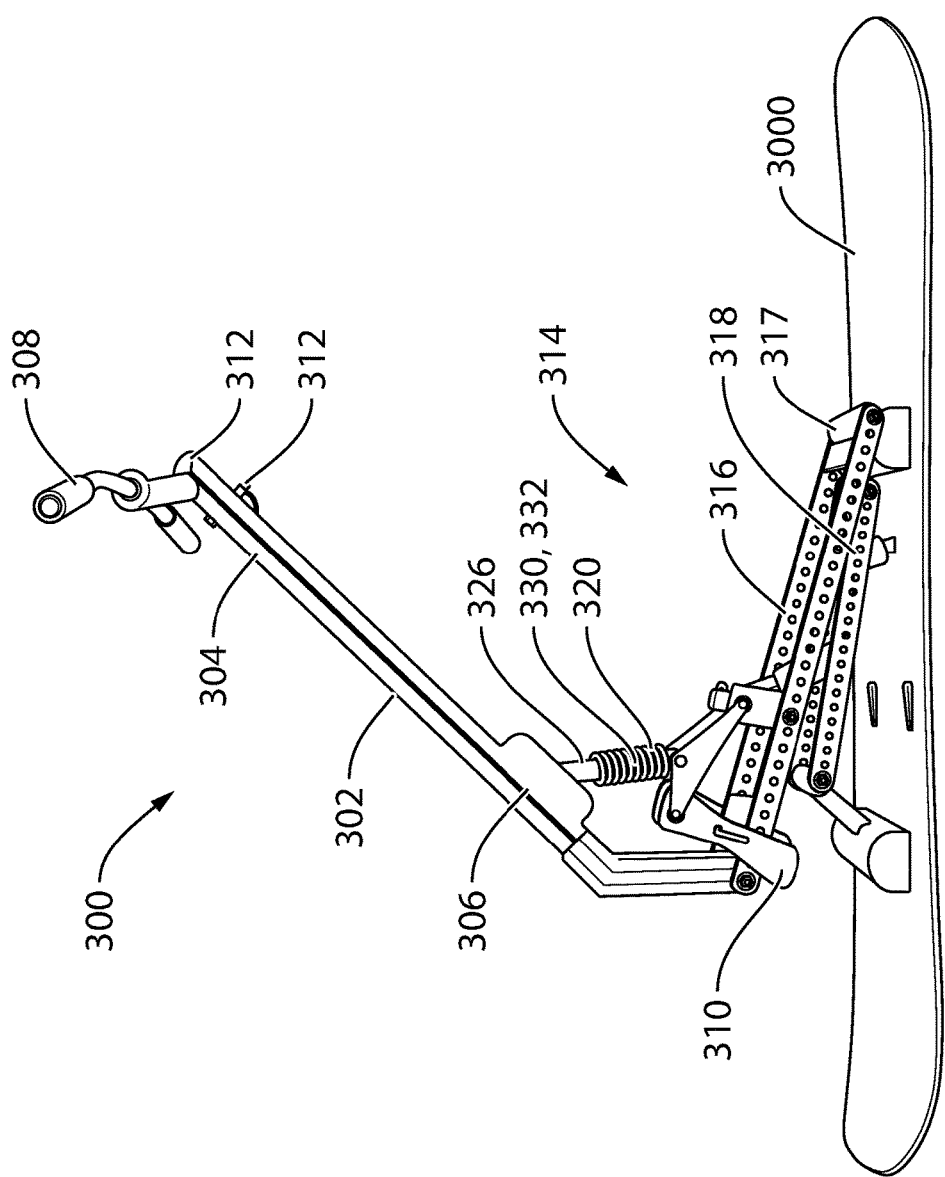
FIG. 12 is a left oblique view of a third embodiment of a snow bike apparatus according to aspects of the present invention, the snow bike apparatus shown in an unfolded configuration for operation.
Figure 13:
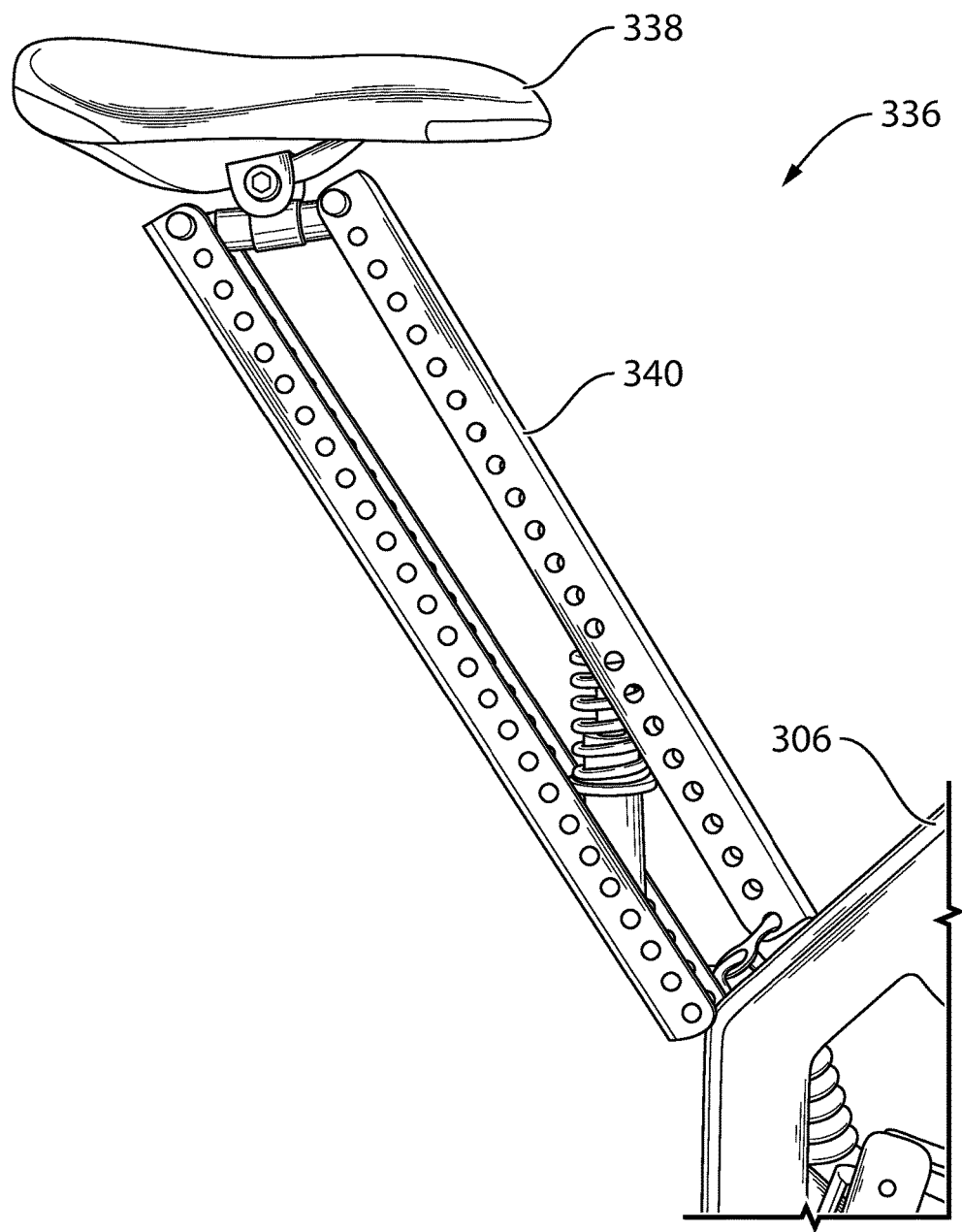
FIG. 13 is a left oblique view of the embodiment of FIG. 12, with a seat assembly attached.

FIGS. 12-13 show a snow bike apparatus according to a third embodiment of the present invention, generally illustrated at 300.

The apparatus 300 is attachable to a runner 3000 that is slidable over terrain (not shown), for example snow, ice or sand. In one embodiment, the runner 3000 is a conventional snowboard with conventional bindings, which provide a forward attachment point 3002 and an aft attachment point 3004 at which to attach the apparatus 300.

The foundation of the apparatus 300 is an elongated support 302 having a handlebar end 304 and an opposite footrest end 306. The apparatus 300 further includes a handlebar assembly 308 connected to the handlebar end 304 of the support 302 and a footrest assembly 310 proximate to the footrest end 306 of the support 302. As illustrated, the handlebar assembly 308 may be pivotally connected to the handlebar end 304 of the support 302. The handlebar assembly 308 and the footrest assembly 310 may include lockable pivots 312 to provide further folding.

The apparatus 300 also includes a user-adjustable mounting linkage 314 that connects the support 302 to the runner 3000, the user-adjustable mounting linkage 314 including:

a forward bar 316, pivotally connected to the footrest end 306 of the support 302 and pivotally attachable via a forward footing 317 to the forward attachment point 3002 of the runner 3000, and an aft bar 318, pivotally connected to the forward bar 316 and pivotally attachable via an aft footing 319 to the aft attachment point 3004 of the runner 3000.

In this embodiment, the footrest assembly 310 is connected to the forward bar 316, proximate to the footrest end 306 of the support 302.

The user-adjustable mounting linkage 314 further includes a suspension assembly 320 coupling the forward bar 316 to the support 302.

As illustrated, the location at which the aft bar 318 is pivotally connected to the forward bar 316 may be user-selectable.

As illustrated, the suspension assembly 320 may include a first strut assembly 326 connected between the forward bar 316 and the support 302. The first strut assembly 326 may include a spring 330 or more generally a shock absorber 332.

As illustrated, the apparatus 300 may further include a seat assembly 336, including a saddle 338 attachable to the support 302, for example by a user-adjustable four-bar linkage 340, for example a sprung four-bar linkage 340.

To provide for tuning the apparatus 300 for particular user's characteristics, for example size, weight and desired riding style, and for particular terrain, it may be desirable to be able to adjust the apparatus 300. In this regard, as illustrated, the location at which the first strut assembly 326 is connected to at least one of the forward bar 316 and the support 302 may be adjustable, for example user-selectable.

To provide for transforming the apparatus 300 between a folded configuration, for storage or transport, and an unfolded configuration for use, at least one of:

the connection between the handlebar assembly 308 and the support 302, the connection between the forward bar 316 and the support 302, the connection between the aft bar 318 and the forward bar 316, and the connection between the first strut assembly 326 and the forward bar 316, may be adapted to be connected, disconnected, and/or pivoted by a user.

Those skilled in the art will recognize that all pivots may be user-lockable or tightenable, for example in conventional ways.

(b) Operation of Specific Embodiments

With reference now to FIGS. 1-13, the operation of these specific embodiments of the invention will now be described.

The apparatus 100, 200, 300 may be configured in a folded configuration (e.g. FIG. 2 or 8) for storage and transport. To use the apparatus 100, 200, 300, a user would open it into an unfolded configuration (e.g. FIG. 1, 7, or 12), via intermediate configurations (e.g. FIGS. 3-6 and 9-11), wherein the handlebar assembly 108, 208, 308 has been unfolded, the footrest assembly 110, 210, 310 has been unfolded, and the forward bar 116, 216, 316 and aft bar 118, 218, 318 have been unfolded.

Thus, in the process of unfolding the apparatus 100, 200, 300 into an unfolded configuration, a user would pivot the handlebar assembly 108, 208, 308 away from the support 102, 202, 302, the forward bar 116, 216, 316 away from the support 102, 202, 302 and the aft bar 118, 218, 318 away from the forward bar 116, 216, 316. The user would also fully unfold the handlebar assembly 108, 208, 308 and the footrest assembly 110, 210, 310 at their lockable pivots 112, 212, 312.

To tune the apparatus 100, 200, 300 for the particular characteristics of the user, the terrain (or the weather or more broadly the environment) or the runner 1000, 2000, 3000 or the preferences of the user, the pivot points of the apparatus 100, 200, 300 might be adjusted, for example as between the forward bar 116, 216, 316 and the aft bar 118, 218, 318 or between the first strut assembly 126, 226, 326 and either the support 102, 202, 302 or the aft bar 118, 218 or the forward bar 316, or between the second strut assembly 128 and either the forward bar 116 or the aft bar 118. Some pivot points might be limited, for example via the limiting subassembly 122, 222 for example with a locking pin 124, 224. During this unfolding and tuning, the user would also attach the apparatus 100, 200, 300 to the runner 1000, 2000, 3000, by attaching the forward bar 116, 216, 316 to the forward attachment point 1002, 2002, 3002 via the forward footing 117, 217, 317 and the aft bar 118, 218, 318 to the aft attachment point 1004, 2004, 3004 via the aft footing 119, 219, 319.

Figure 2:
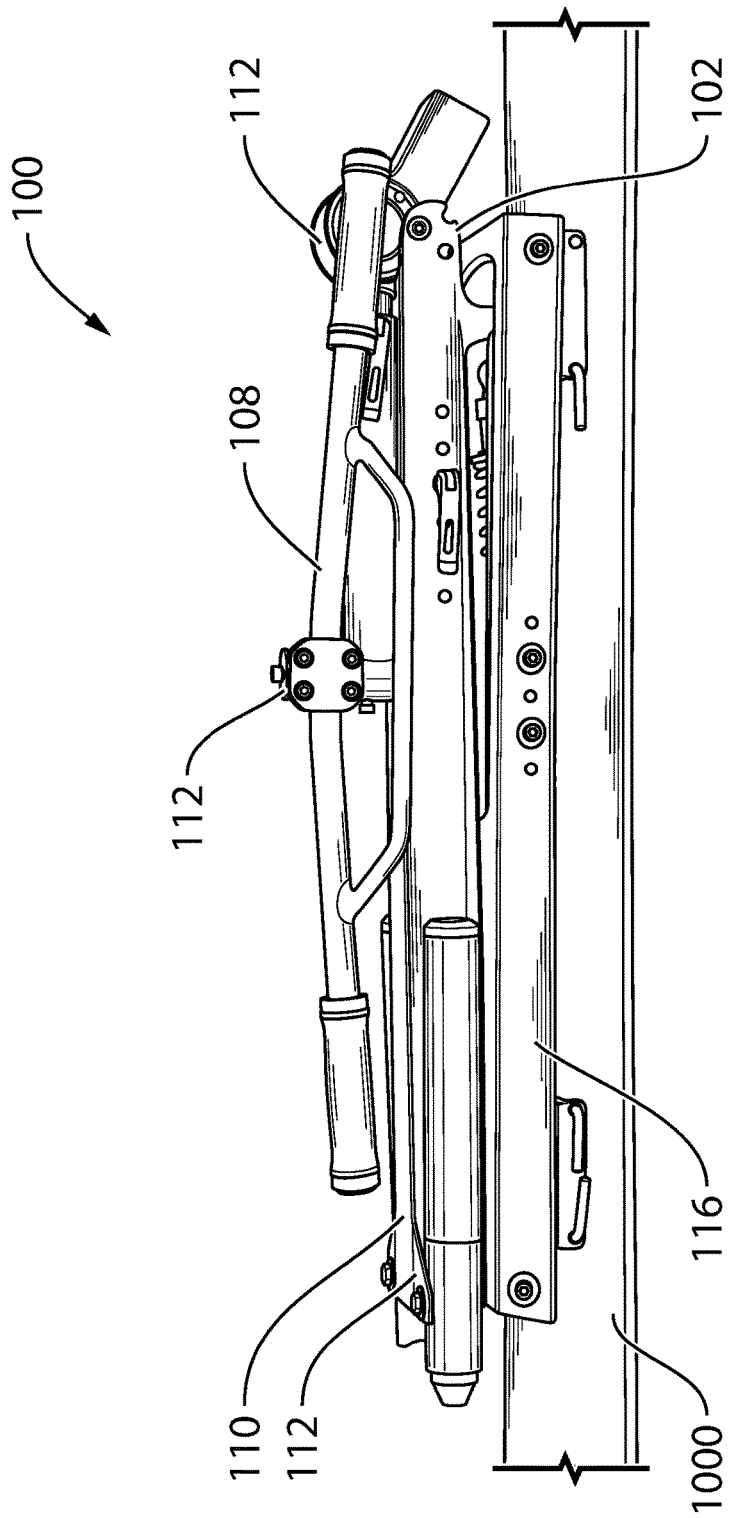
FIG. 2 is a left oblique view of the embodiment of FIG. 1, the snow bike apparatus shown in a folded configuration for storage or transport.
Figure 3:
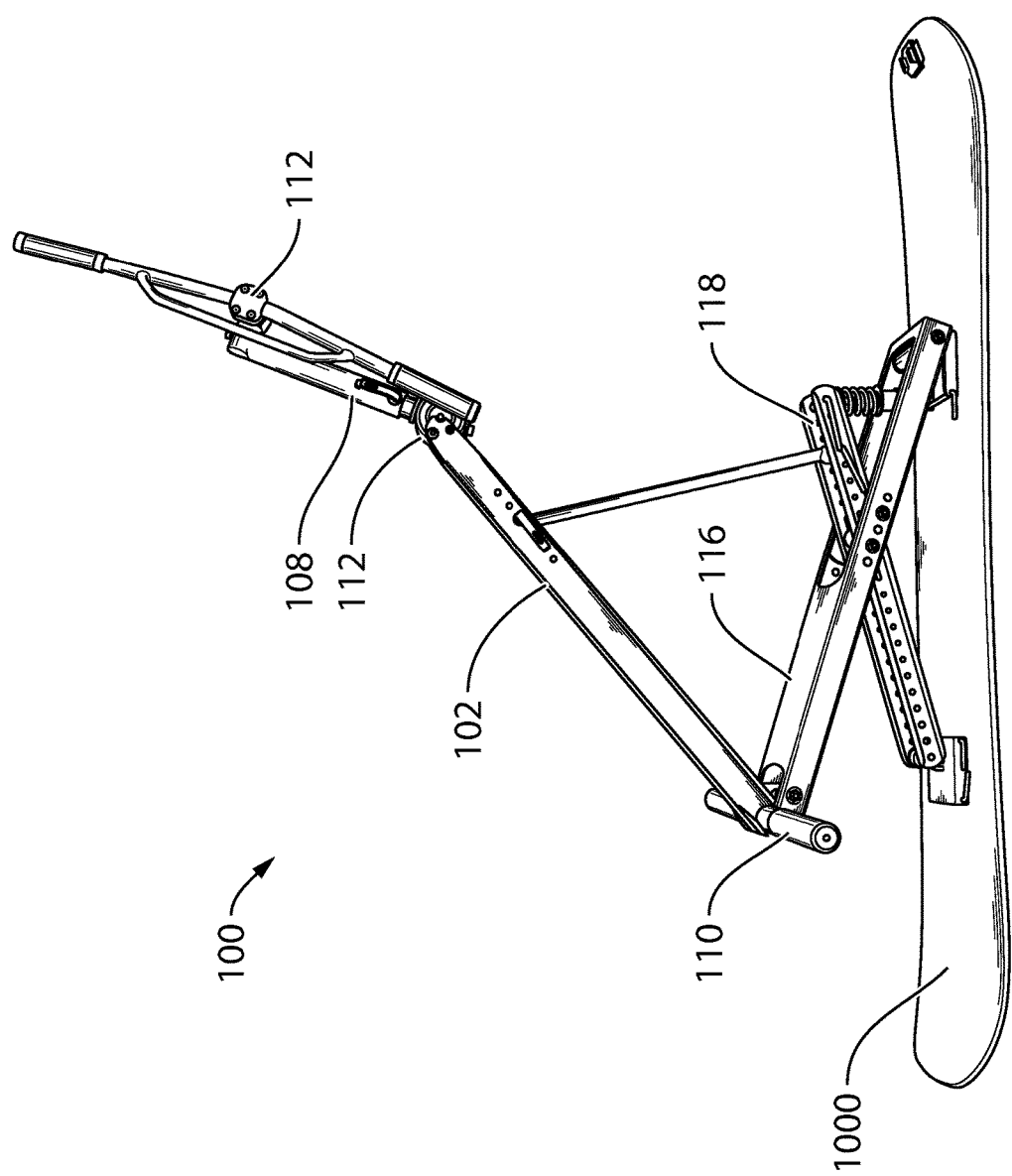
FIG. 3 is a left oblique view of the embodiment of FIG. 1, the snow bike apparatus shown in an intermediate configuration with a handle bar mechanism pivoted.
Figure 4:
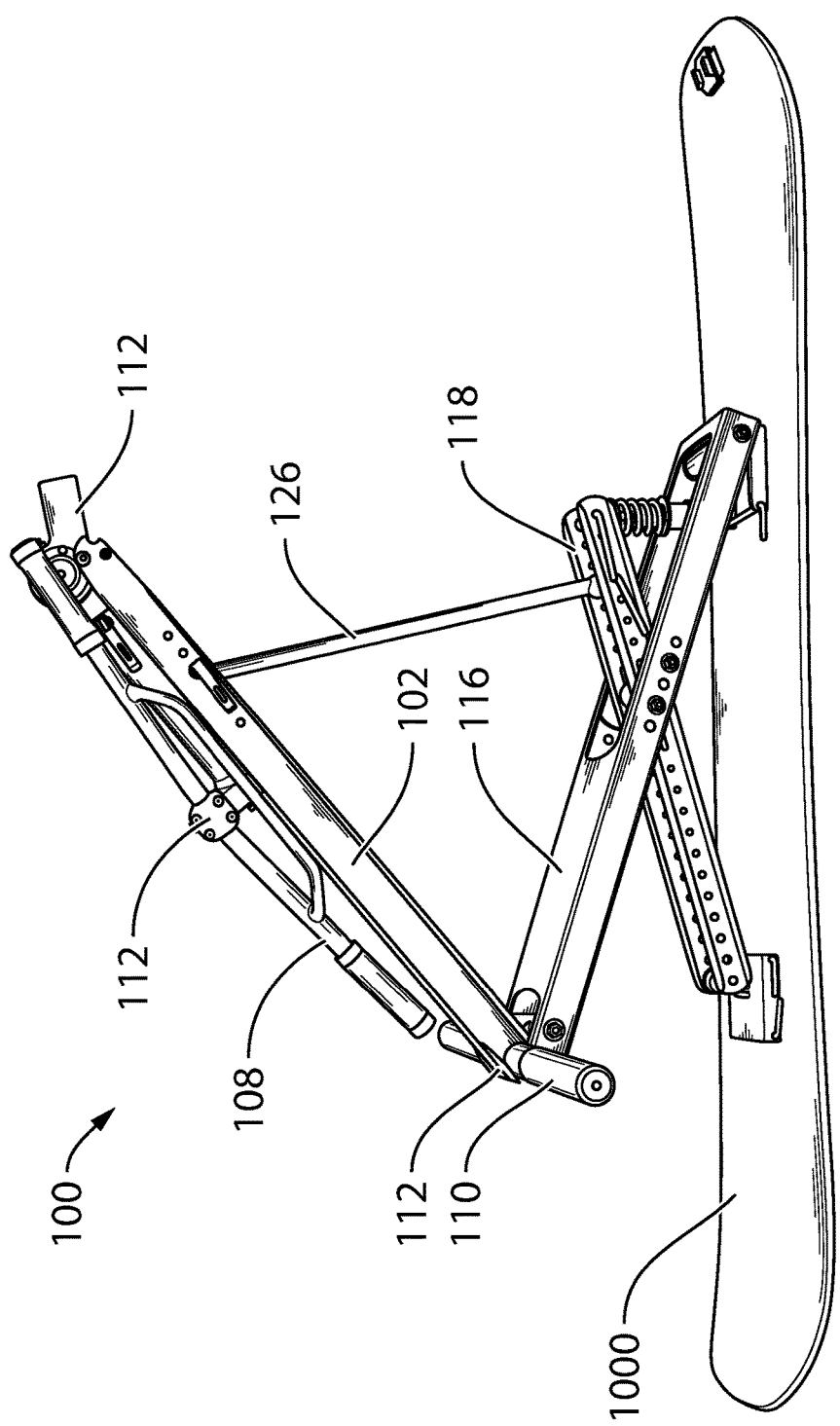
FIG. 4 is a left oblique view of the embodiment of FIG. 1, the snow bike apparatus shown in an intermediate configuration with the handle bar mechanism further pivoted.
Figure 5:
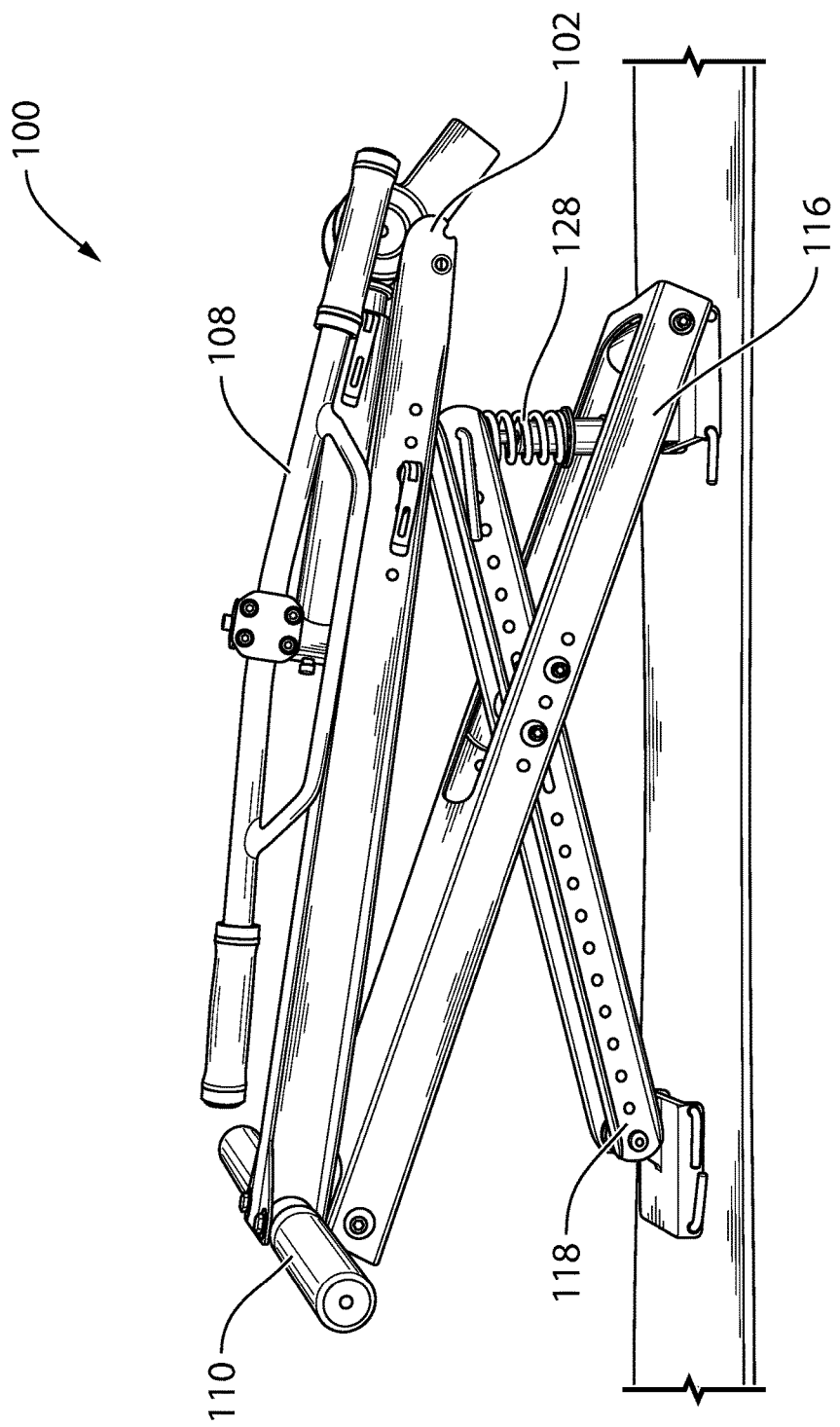
FIG. 5 is a left oblique view of the embodiment of FIG. 1, the snow bike apparatus shown in an intermediate configuration with a support pivoted.
Figure 6:
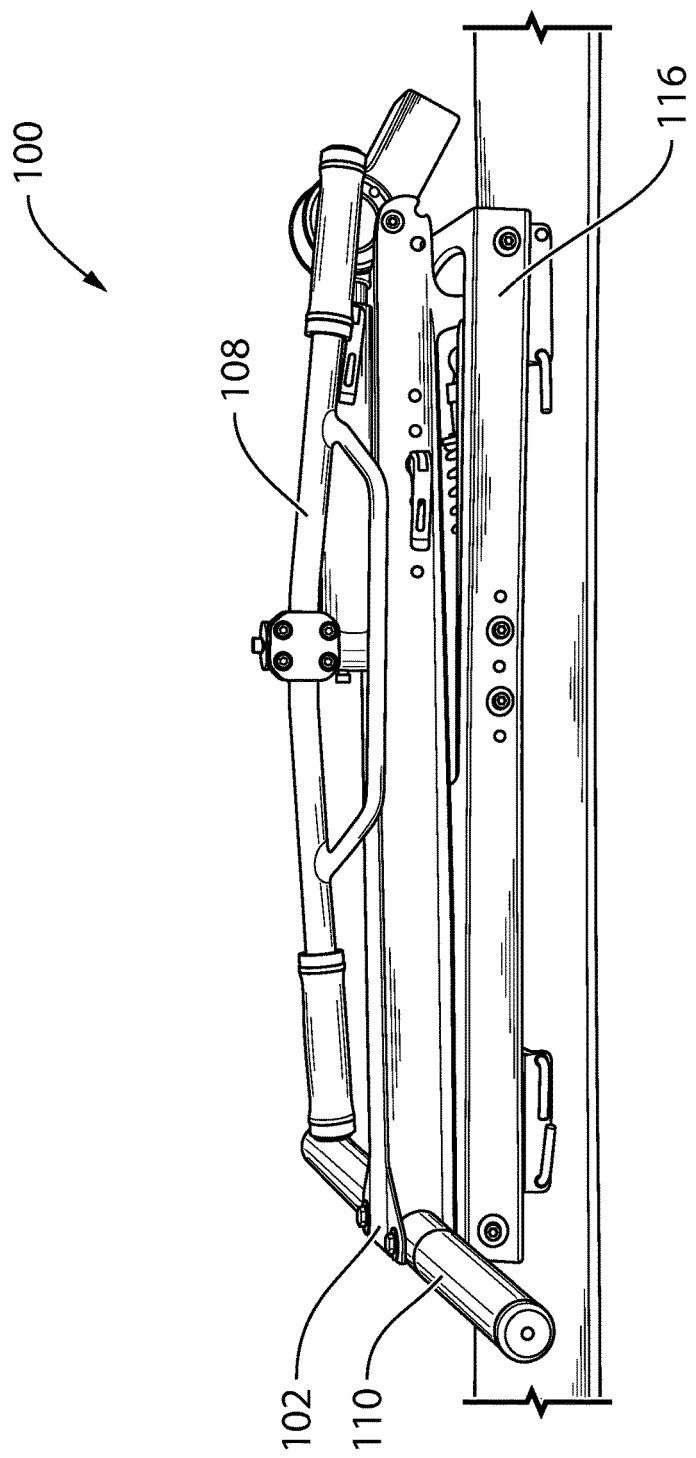
FIG. 6 is a left oblique view of the embodiment of FIG. 1, the snow bike apparatus shown in an intermediate configuration with a forward bar and aft bar pivoted.
Figure 7:
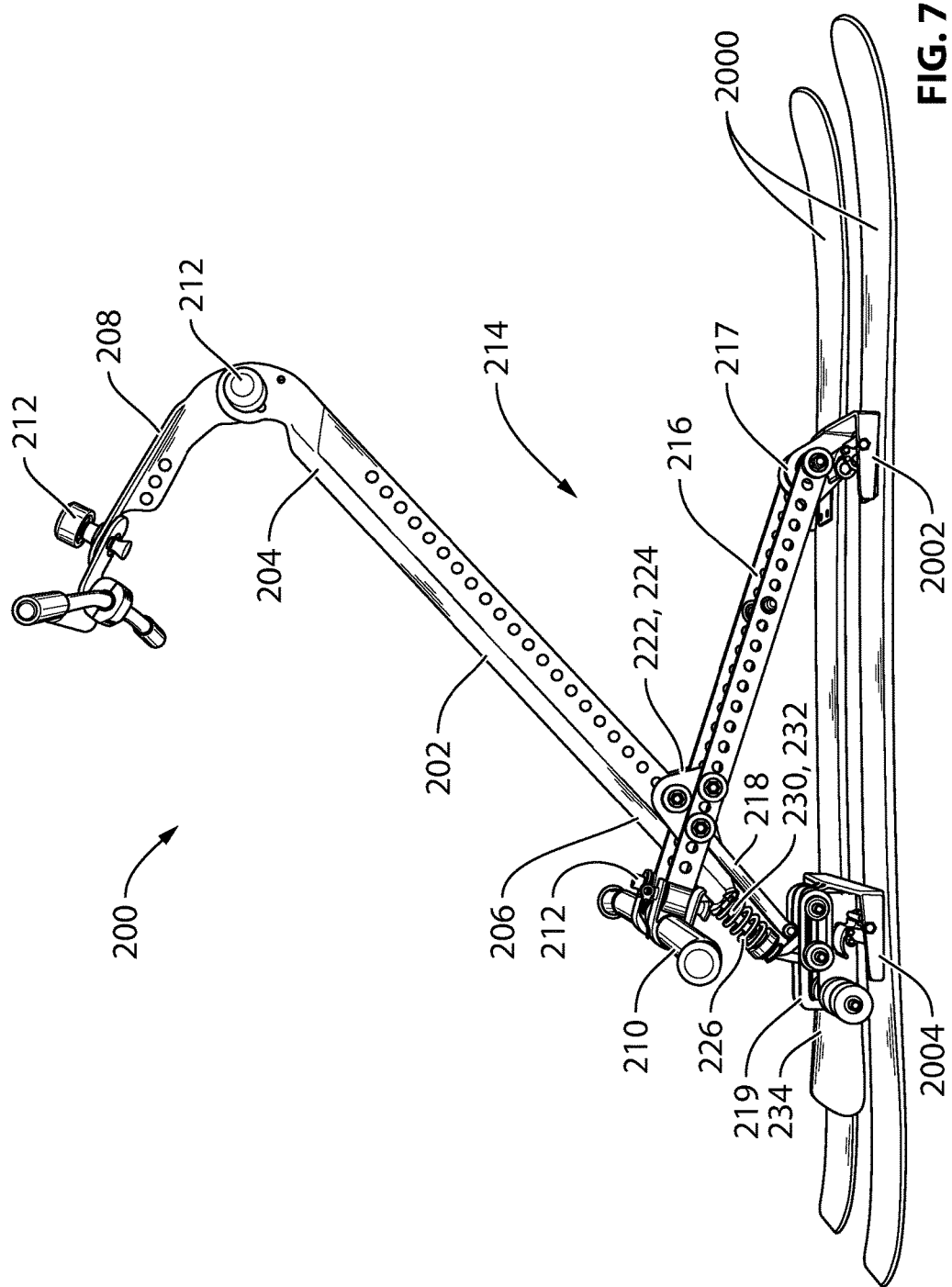
FIG. 7 is a left oblique view of a second embodiment of a snow bike apparatus according to aspects of the present invention, the snow bike apparatus shown in an unfolded configuration for operation.
Figure 8:
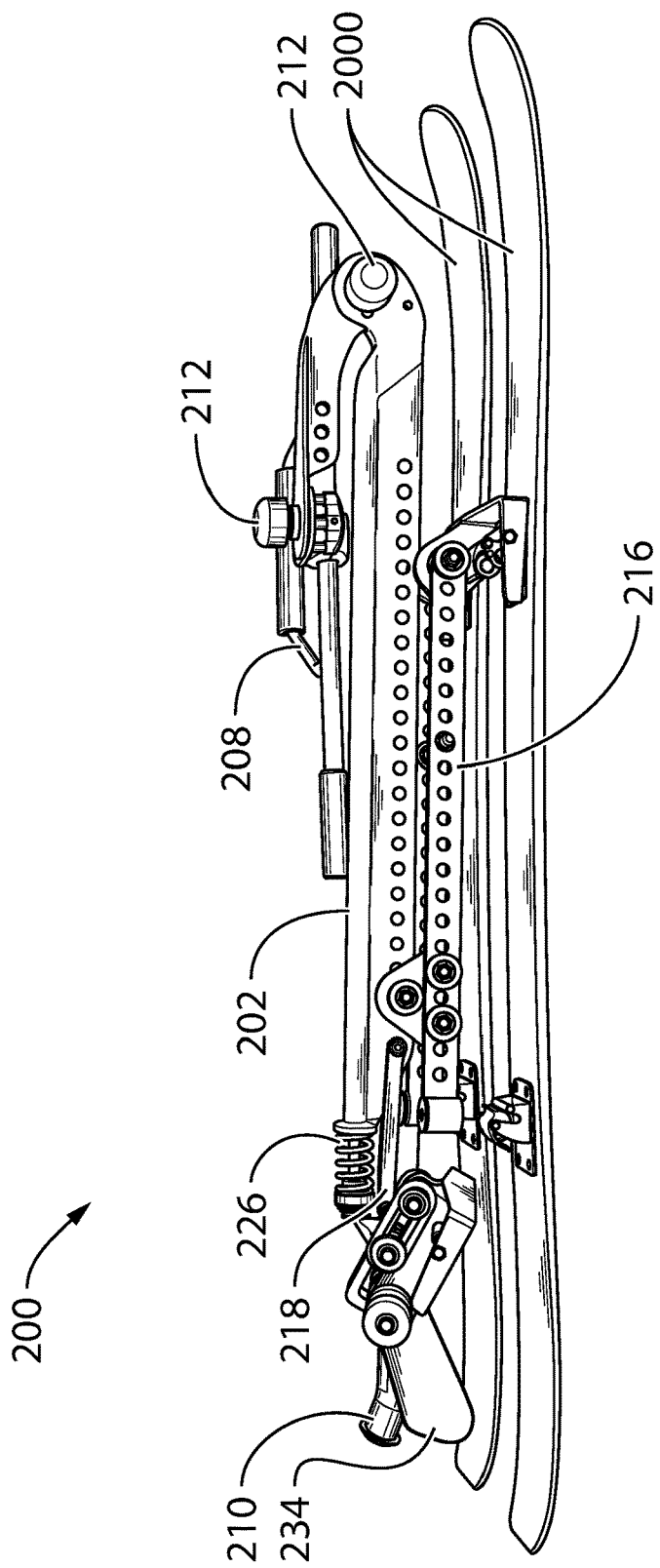
FIG. 8 is a left oblique view of the embodiment of FIG. 7, the snow bike apparatus shown in a folded configuration for storage or transport.
Figure 9:
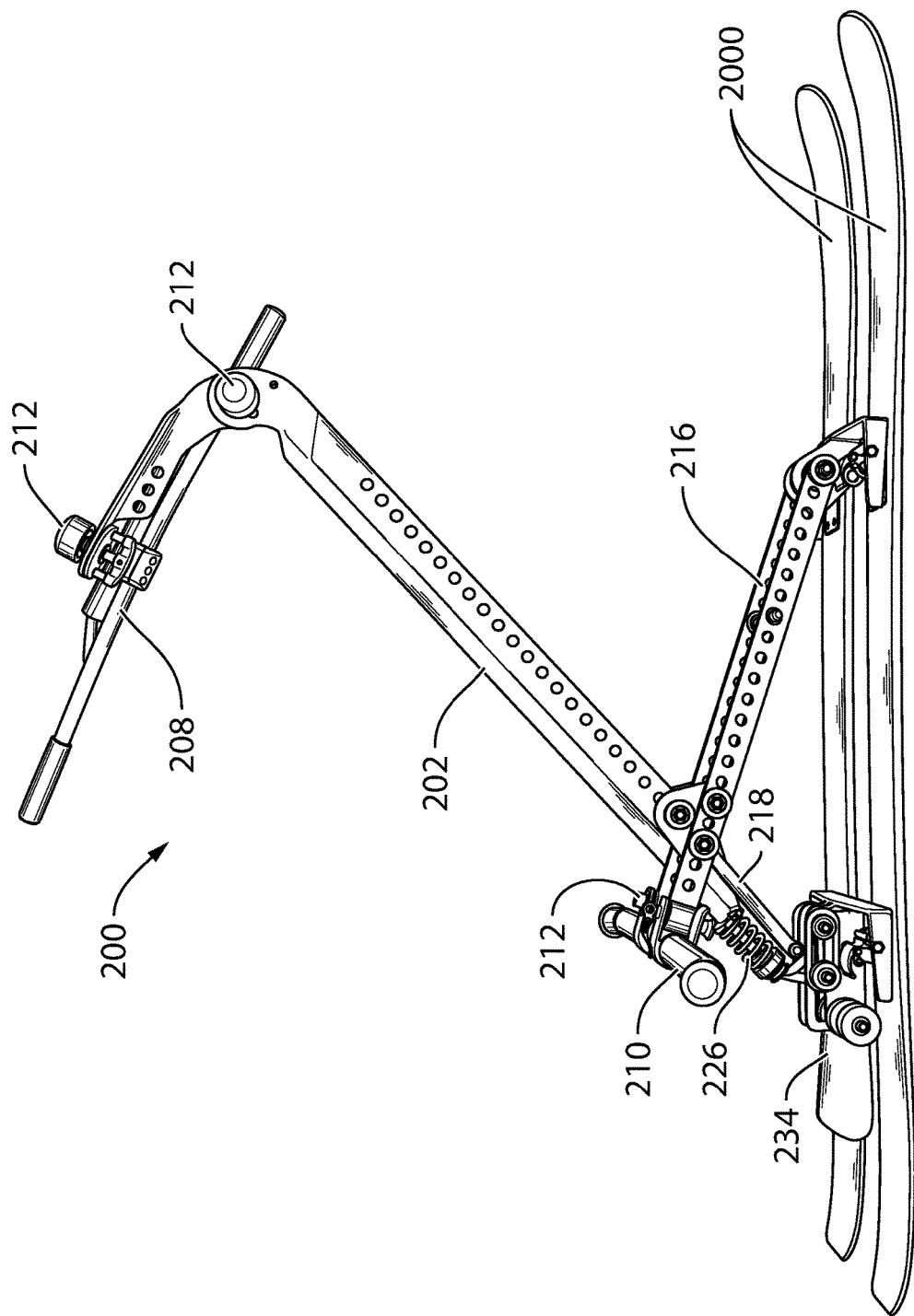
FIG. 9 is a left oblique view of the embodiment of FIG. 7, the snow bike apparatus shown in an intermediate configuration with a handle bar mechanism pivoted.
Figure 10:
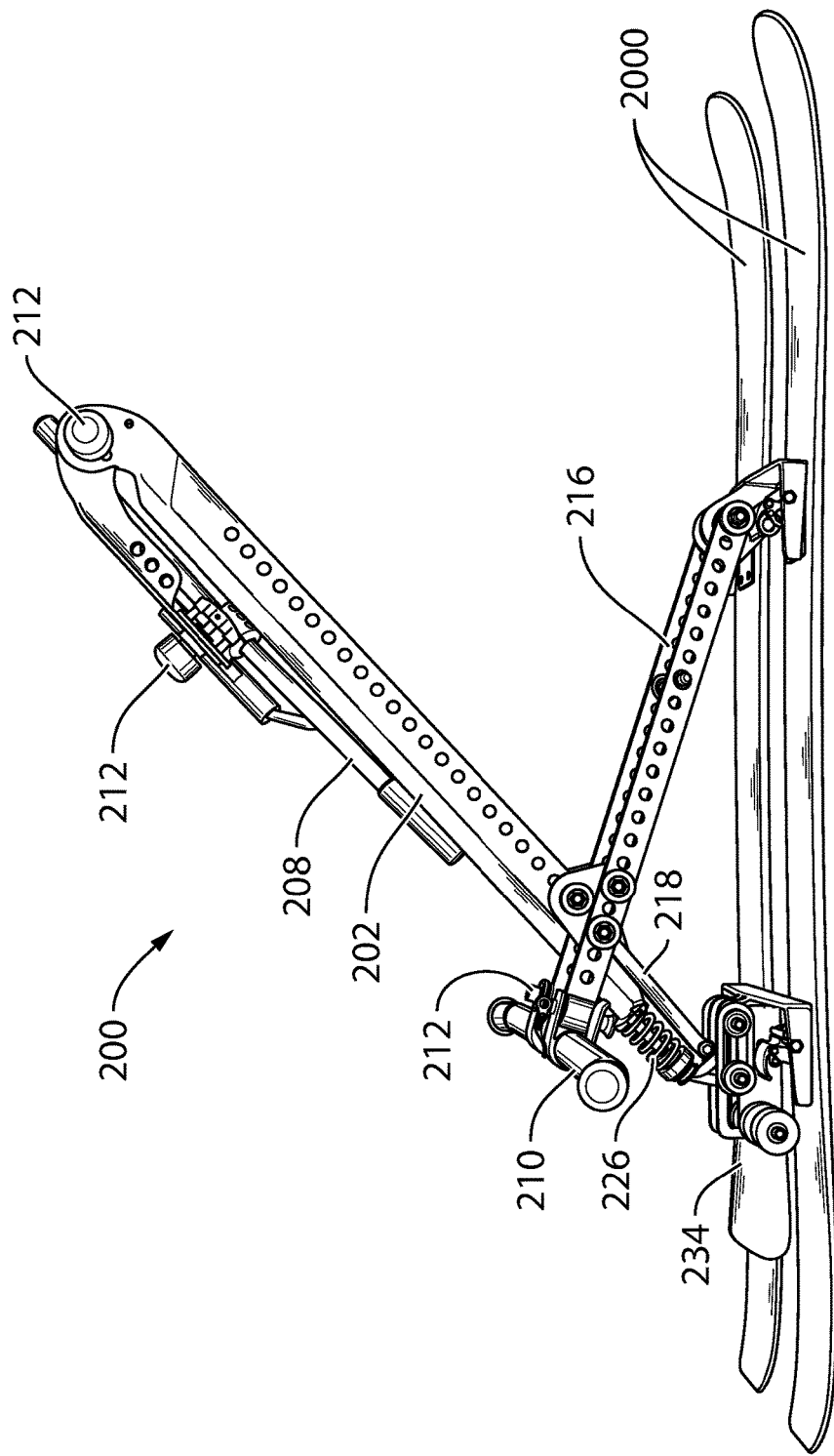
FIG. 10 is a left oblique view of the embodiment of FIG. 7, the snow bike apparatus shown in an intermediate configuration with the handle bar mechanism further pivoted.
Figure 11:
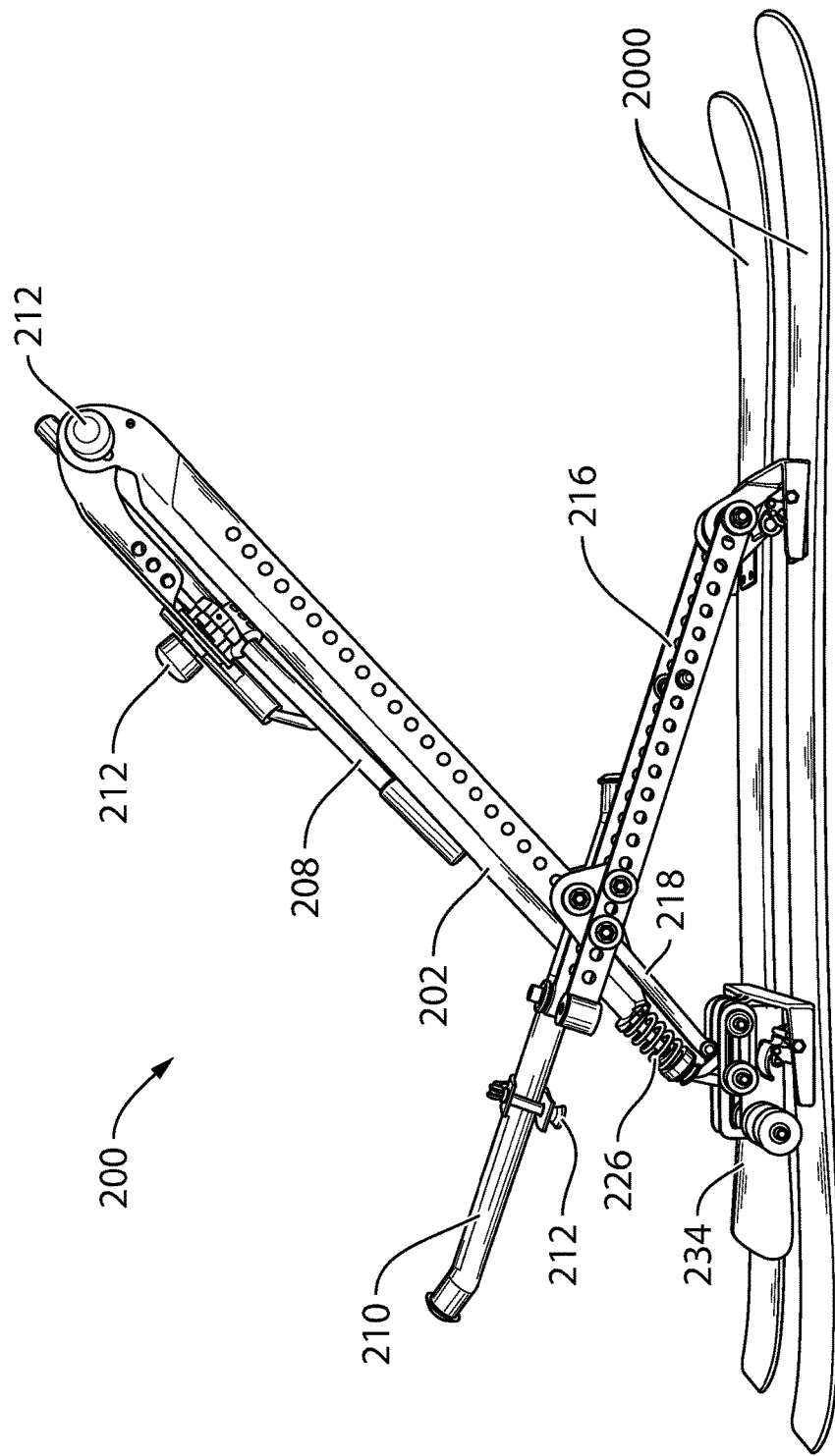
FIG. 11 is a left oblique view of the embodiment of FIG. 7, the snow bike apparatus shown in an intermediate configuration with a footrest mechanism pivoted.

When finished using the apparatus 100, 200, 300, whether temporarily (for example for a meal break or for transport back up a mountain), or for a longer period of time (for example at the end of a day or a season), the user might reverse some or all of these steps to fold the apparatus 100, 200, 300 into a folded configuration (such as shown in FIG. 2 or 8) or perhaps an intermediate configuration (such as shown in FIG. 3-6 or 9-11), perhaps detached from the runner 1000, 2000, 3000.

(c) Conclusion

Thus, it will be seen from the foregoing embodiments and examples that there has been described an apparatus for attachment to a slidable runner, adjustable between a folded configuration for transport or storage and an unfolded configuration for use, and tunable to match various terrain characteristics and user characteristics and preferences.

While specific embodiments of the invention have been described and illustrated, such embodiments should be considered illustrative of the invention only and not as limiting the invention as construed in accordance with the accompanying claims. In particular, all quantities described have been determined empirically and those skilled in the art might well expect a wide range of values surrounding those described to provide similarly beneficial results.

It will be understood by those skilled in the art that various changes, modifications and substitutions can be made to the foregoing embodiments without departing from the principle and scope of the invention, as expressed in the claims made herein.

While the invention has been described as having particular application for personal use, those skilled in the art will recognize it has wider application.

What is claimed is:

1. An apparatus for attachment to a slidable runner at forward and aft attachment points, comprising:
   a. an elongated support, having a handlebar end and an opposite footrest end,
   b. a handlebar assembly connected to the handlebar end of the support,
   c. a footrest assembly proximate to the footrest end of the support,
   d. a forward bar, pivotally connected to the footrest end of the support and pivotally attachable to the forward attachment point of the runner,
   e. an aft bar, pivotally connected to the forward bar and pivotally attachable to the aft attachment point of the runner, and
   f. a suspension assembly coupling at least one of the forward bar and aft bar to the support.

2. The apparatus as claimed in claim 1, wherein a location at which the aft bar is pivotally connected to the forward bar is user-selectable.

3. The apparatus as claimed in claim 1, further including a limiting subassembly adapted to limit pivoting at the connection between the aft bar and the forward bar.

4. The apparatus as claimed in claim 3, wherein the limiting subassembly includes a locking pin.

5. The apparatus as claimed in claim 1, wherein the suspension assembly includes a first strut assembly connected between the aft bar and the support and a second strut assembly connected between the aft bar and the forward bar.

6. The apparatus as claimed in claim 5, wherein at least one of:
   a. a location at which the first strut assembly is connected to at least one of:
      i. the aft bar, and
      ii. the support, and
   b. a location at which the second strut assembly is connected to at least one of:
      i. the aft bar, and
      ii. the forward bar,
   is user-selectable.

7. The apparatus as claimed in claim 5, wherein the second strut assembly includes at least one of:
   a. a spring, and
   b. a shock absorber.

8. The apparatus as claimed in claim 5, wherein the handlebar assembly is pivotally connected to the handlebar end of the support.

9. The apparatus as claimed in claim 8, wherein at least one of:
   a. a connection between the handlebar assembly and the support,
   b. a connection between the forward bar and the support,
   c. a connection between the aft bar and the forward bar,
   d. a connection between the first strut assembly and the aft bar,
   e. a connection between the first strut assembly and the support,
   f. a connection between the second strut assembly and the aft bar, and
   g. a connection between the second strut assembly and the forward bar, is adapted to be at least one of connected, disconnected, and pivoted by a user to transform the apparatus between an unfolded configuration and a folded configuration.

10. The apparatus as claimed in claim 1, wherein the handlebar assembly is pivotally connected to the handlebar end of the support.

11. The apparatus as claimed in claim 1, further including the runner.

* * * * *